(12) United States Patent
Limbeck

(10) Patent No.: US 8,043,755 B2
(45) Date of Patent: Oct. 25, 2011

(54) FUEL CELL BASED POWER GENERATION SYSTEMS AND METHODS OF OPERATING THE SAME

(75) Inventor: Uwe Limbeck, Kirchheim (DE)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 1158 days.

(21) Appl. No.: 11/587,140

(22) PCT Filed: Apr. 22, 2005

(86) PCT No.: PCT/US2005/013773
§ 371 (c)(1),
(2), (4) Date: May 23, 2007

(87) PCT Pub. No.: WO2005/107000
PCT Pub. Date: Nov. 10, 2005

(65) Prior Publication Data
US 2007/0287037 A1    Dec. 13, 2007

Related U.S. Application Data

(60) Provisional application No. 60/631,705, filed on Nov. 30, 2004.

(30) Foreign Application Priority Data

Apr. 23, 2004 (DE) .......................... 10 2004 020 029

(51) Int. Cl.
*H01M 8/04* (2006.01)
(52) U.S. Cl. ........ 429/433; 429/413; 429/414; 429/429; 429/427; 429/428; 429/436; 429/437; 429/442
(58) Field of Classification Search ................ 429/413, 429/414, 429, 427, 428, 436, 433, 437, 440
See application file for complete search history.

(56) References Cited

U.S. PATENT DOCUMENTS

| | | | |
|---|---|---|---|
| 4,120,787 A * | 10/1978 | Yargeau ......................... | 210/664 |
| 5,753,383 A | 5/1998 | Cargnelli et al. | |
| 6,492,044 B1 | 12/2002 | Walsh | |
| 2001/0035694 A1 | 11/2001 | Roeser et al. | |
| 2002/0041984 A1 | 4/2002 | Chow et al. | |
| 2003/0162063 A1* | 8/2003 | Yoshizawa et al. ............. | 429/24 |
| 2003/0198851 A1* | 10/2003 | Sone et al. ...................... | 429/30 |
| 2004/0062961 A1* | 4/2004 | Sato et al. ....................... | 429/19 |

FOREIGN PATENT DOCUMENTS

| | | |
|---|---|---|
| EP | 0 788 172 A1 | 8/1997 |
| JP | 2003-142136 A | 5/2003 |
| WO | WO 2005/010700 A2 | 2/2005 |

OTHER PUBLICATIONS

Form PCT/IPEA/416 (one (1) page) and Form PCT/IPEA/409 (twelve (12) pages) totaling (thirteen (13) pages), Apr. 23, 2004.

* cited by examiner

*Primary Examiner* — Patrick Ryan
*Assistant Examiner* — Ben Lewis
(74) *Attorney, Agent, or Firm* — Crowell & Moring LLP

(57) ABSTRACT

A power generation system has a fuel cell stack and at least one condensation point in the system at which water present after shutdown of the power generation system can condense or collect. Drying after shutdown is improved by maintaining a temperature gradient between the condensation point and at least one other component in the power generation system after shutdown. In one embodiment, the temperature gradient is maintained by housing the fuel cell stack in a thermally insulated container and arranging the condensation point outside of the insulating container. In another embodiment, drying after shutdown is accomplished with an adsorption unit having a water-adsorbing material arranged in a desired location within the power generation system.

12 Claims, 5 Drawing Sheets

FUEL CELL BASED POWER GENERATION SYSTEMS AND METHODS OF OPERATING THE SAME

This application claims the priority of German patent document 10 2004 020 029.7, filed Apr. 23, 2004 and U.S. Ser. No. 60,631,705, filed Nov. 30, 2004 (PCT International Application No. PCT/US2005/013773, filed Apr. 22, 2005), the disclosures of which are expressly incorporated by reference herein.

BACKGROUND OF THE INVENTION

The present systems and methods relate to fuel cell based power generation systems for the generation of electrical energy, and particularly, to improving the freeze-start capability of such systems.

Fuel cells are electrochemical energy converters, which directly convert chemical energy to electrical energy. For this purpose, the fuel cell is supplied with a fuel and with oxidant (such as air) as reactants. The reactants are spatially separated by an electrolyte, through which ion exchange takes place. Example fuels include hydrogen, or methane. There are several known types of fuel cells, including polymer electrolyte membrane fuel cells (PEMFC), phosphoric acid fuel cells (PAFC), and solid oxide fuel cells (SOFC). This list is not complete and the present systems and methods are not limited to a specific type of fuel cell, nor to a specific fuel, nor to a specific application. For example, the application of the present systems and methods invention in a motor vehicle is only one possible embodiment.

Water is present in fuel cells. It may be produced in the fuel cell as a product of the reaction of hydrogen and oxygen, or it may be supplied to the fuel cell for cooling or humidification purposes. For example, the membrane serving as electrolyte in PEM fuel cells must be humidified to allow an efficient cation exchange. Thus, typically either or both of the fuel and oxidant streams may be humidified with water in a humidifier upstream of the fuel cell. Water may also be conducted through special cooling channels in the fuel cell to cool it.

After an operational shutdown of a fuel cell, the temperature of the fluids contained therein and of the components of the power generation system gradually drop to ambient temperature. During this period, water vapor that is still present in the fluid channels of the power generation system condenses and precipitates as liquid water. If the ambient temperature drops below 0° C., any water present in the power generation system may freeze. Such water may be located in the fuel cells, but may also be present in other areas of the power generation system, such as circulation devices (e.g., pumps, compressors, fans, blowers) for the reactants, valves, or in the flow channels that conduct the reactant streams or the cooling water through the power generation system. Often, the flow channels have areas in which water can accumulate, such as in corners or at the end of dead ends where sensors are located.

Problems may occur upon resumption of power generation if condensed water drops or ice are still present in the system. The presence of ice or condensed water may obstruct the flow of reactants, and the presence of ice in particular may affect the proper functioning of system components, such as valves, sensors, or circulation devices. In some situations, this may result in damage to the components.

To prevent accumulation of water drops and ice and to improve the freeze-starting capability of fuel cell systems, a conventional approach is to purge (i.e., blow dry gas through) the flow channels of the system immediately after operation ceases. However, this method has disadvantages. The use of purging requires considerable amounts of time and energy. Moreover, as the quantity of water present in the system is unknown, it is difficult to estimate whether the amount of purge gas and the duration of the purging will be adequate for sufficient drying. Furthermore, it is difficult for the purge gas to reach water that has been deposited at poorly accessible spots of the flow channel system, such as at the ends of flow channels and in corners. Moreover, the membranes of PEM fuel cells can normally not be dried completely. There will always be small remaining reservoirs, from which water is able to diffuse to other locations and, in particular, to critical positions in the power generation system.

Japanese patent document JP 2003-142136 proposes the provision of a condenser for drying the internal fluid channels of a fuel cell stack, where the condenser is cooled during a power generating operation. For vehicular fuel cell stacks, Japanese patent document JP 2003-142136 proposes disposing the condenser just behind the radiator grill, so that it is cooled by the air draft. The object of this arrangement is to permit water vapor that is still present in the fluid channels of the fuel cell stack after operation ceases to travel through an open path to the condenser, and to precipitate there. Thus, the condenser forms a predetermined condensation point.

An alternate approach to minimize or avoid the problems associated with freezing water in a fuel cell stack is to house the fuel cell stack in a thermally insulated container. This approach is described in published U.S. Patent Application No. 2003/0162063. One drawback of using the thermally insulated container housing only the fuel cell stack, however, is that the other components of the power generation system may retain water in inaccessible locations. The system described in US 2003/0162063 keeps residual water in the fuel cell stack from freezing by maintaining the temperature in the insulating container sufficiently above freezing with a heating system arranged in the insulating container. However, water droplets may remain in the reactant channels of the power generation system after an operational shutdown.

BRIEF SUMMARY OF THE INVENTION

The present invention provides a power generation system having a fuel cell stack composed of one or more fuel cells, as well as at least one predetermined condensation point, on which water that is present in the power generation system after an operational shutdown condenses. Methods and apparatus are provided, which are intended and designed to inhibit an equalization (reduction) of the temperature gradient between the predetermined condensation point and at least other parts of the power generation system after operation of the system ceases. Thus, after shutdown the temperature gradient may be maintained by force, or at least its weakening may be attenuated.

There are various measures that may be implemented to inhibit the temperature equalization. In one embodiment, the apparatus used for this purpose may comprise at least a thermally insulating jacket, for example in the form of an insulating container that houses at least the fuel cell stack, where the predetermined condensation point is located outside of this insulating container. Other components of the power generation system, such as the reactant supply circulation devices, may be located in the same or in another insulating container. Similarly, it may be advantageous to dispose some or all of the sensors and valves of the power generation system in the insulating container. In one embodiment, only the predetermined condensation point is located outside of the insulating container, together with any adjoining parts of a pipe system in which the reactants and/or the cooling water are transported.

The insulating container of the present invention serves to maintain a temperature gradient between the components installed in the insulating container and a condenser arranged on the outside.

Not all of the components of the power generation system that are to be insulated with respect to the predetermined condensation point need be housed within the same insulating container. In alternative embodiments, two (or even more) separate insulating containers may be present to house various components of the power generation system. In addition, in some embodiments, there may be a thermal bridge of a material that is a good thermal conductor (e.g., copper) provided between the different insulating containers. In still other embodiments, there may be a thermal bridge between an insulating container and one or more individual components located outside of the insulating container.

Inhibition of temperature equalization may comprise—instead of or in addition to the insulating container—a cooling fan cooling the predetermined condensation point. In alternative embodiments, a heater may be provided for the insulating container.

In other embodiments of the present systems and methods, the power generation system includes a fuel cell stack having one or more fuel cells, and a passive water collecting component, which is intended and designed to attract water that is still present in the power generation system after an operational shutdown of the system. The water-collecting component contains a water-adsorbing material.

An adsorbing material can also aid in achieving the goal of collecting any water still present (in vapor or droplet form) in the power generation system after shutdown at a predetermined location in order to prevent the water from remaining at undesired points within the power generation system. In contrast to for example a pump, adsorbing materials act passively (i.e., no additional energy is required to attract the water), which has a positive effect on the overall energy balance of the power generation system. Suitable candidates for the adsorbing materials include, in principle, all materials that have water-adsorbing properties, such as ion exchange resins, silica gels, or zeolites. The quantity of adsorbing material may be determined based on—among other factors—the quantity of water employed during operation of the power generation system and the expected residual quantity of water in the system after shutdown.

In one embodiment, the water-collecting component that contains the adsorbing material is disposed between the fuel cell stack and a compressor, connected upstream of the stack, that supplies a reactant stream to the fuel cell stack. The reactant stream is heated by the compression, and as a rule moisture will be extracted from the reactant stream, i.e., the reactant stream will become drier. By conducting the warm and dry reactant stream, which is available at the compressor outlet, across the adsorbing material, the latter can be desorbed (regenerated) very efficiently upon resumption of operation. Alternatively, a separate heating element may be provided to regenerate the adsorbing material.

Those of ordinary skill in the art will appreciate that the two aspects described above may be combined. For example, the predetermined condensation point and the adsorbing material may be at locations within the power generation system that are far apart, or alternatively the water-collecting component that contains the adsorbing material to be located in immediate proximity to a cold spot that forms the predetermined condensation point. In still another alternative embodiment, the water-collecting component may be located at the coldest point in the system.

The present invention also includes a method of improving the freeze-starting capability of a power generation system including a fuel cell stack of one or more fuel cells, whereby moisture is extracted from the power generation system after an operational shutdown by means of at least one desired condensation point. According to the invention, equalization of a temperature gradient between the desired condensation point(s) and other (i.e., to-be-dried) components of the power generation system after the operational shutdown of the power generation system is inhibited. The temperature equalization may be inhibited by means of a thermally insulating container, in which at least the fuel cell stack is disposed, with at least one desired condensation point arranged outside of the insulating container.

In an alternative embodiment of the present methods, the freeze-starting capability of a power generation system may be improved by extracting moisture from the power generation system after shutdown by means of a passive water-collecting component, wherein a water-adsorbing material is employed for moisture removal.

Other objects, advantages and novel features of the present invention will become apparent from the following detailed description of the invention when considered in conjunction with the accompanying drawings.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve legibility. Further, the particular shapes of the elements as drawn are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well known structures associated with fuel cells and power generation systems have not been shown or described in detail, to avoid unnecessarily obscuring descriptions of the embodiments of the invention.

Unless the context requires otherwise, throughout the specification and claims which follow, the word "comprise" and variations thereof, such as, "comprises" and "comprising", are to be construed in an open, inclusive sense, that is as "including, but not limited to."

The headings provided herein are for convenience only and do not interpret the scope or meaning of the claimed invention.

It has been observed that drying of the fuel cell stack and other components of the power generation system, such as circulation devices, valves, and sensors, may be insufficient if it relies solely on the temperature gradient established during operation between the condensation point and the other components in the system. Uncontrolled temperature equalization often takes place so rapidly after shutdown that insufficient quantities of the residual water are captured in various regions of the system.

Figure 1:
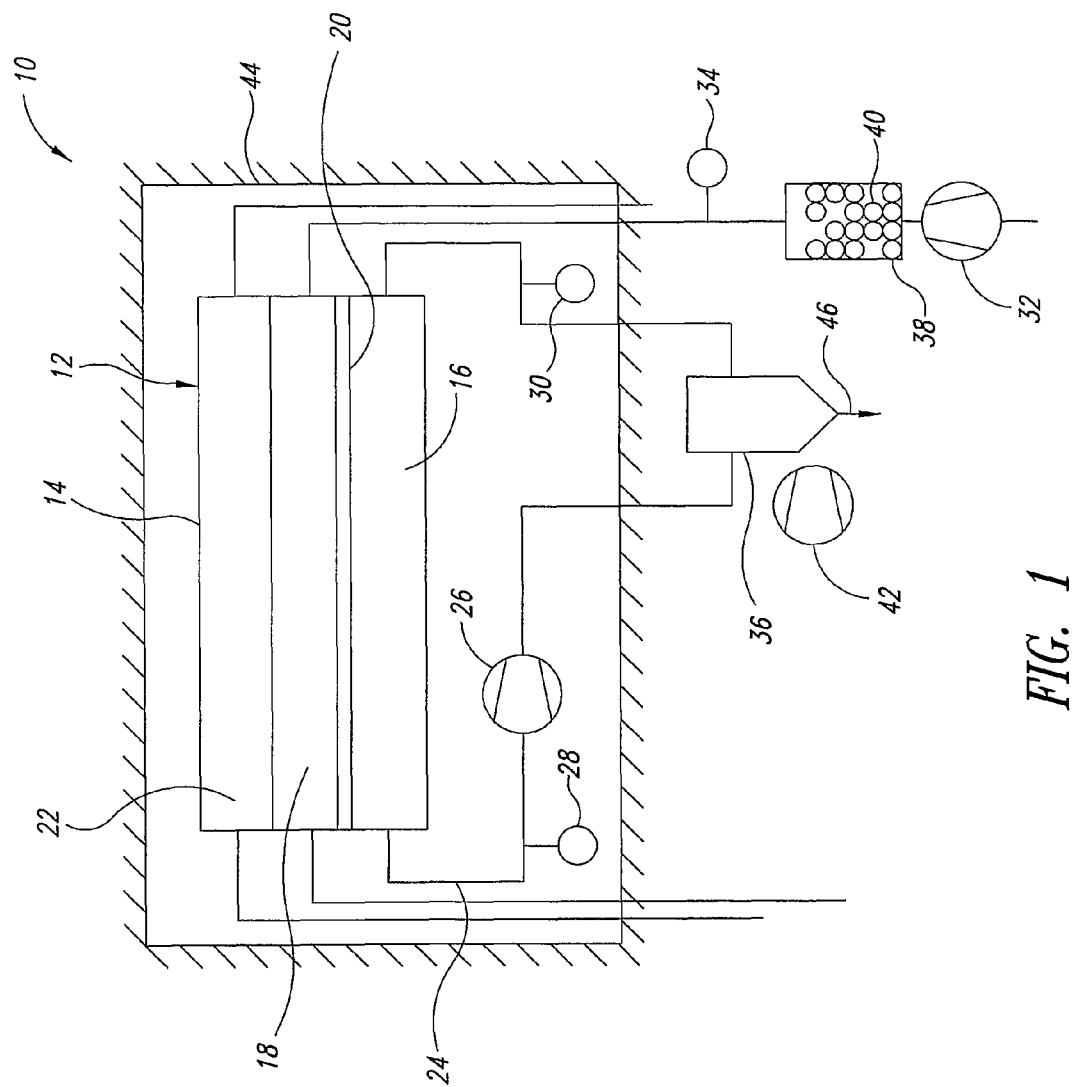
FIG. 1 is a schematic view of a power generation system housed in an insulating container according to one illustrated embodiment of the invention.

FIG. 1 shows a power generation system 10 having a fuel cell stack 12. The fuel cell stack 12 generally comprises a multiplicity of individual fuel cells combined into the stack 12; however for the purpose of clarity, only a single fuel cell 14 is illustrated in FIG. 1. The fuel cell 14 has an anode 16 and a cathode 18, separated by an electrolyte 20. Although not shown in detail in FIG. 1, a fuel stream is supplied to anode 16, while an oxidant stream, such as air, is supplied to cathode 18. In one embodiment, the fuel cell 14 is a polymer electrolyte membrane fuel cell, for use in a motor vehicle. In addition, the fuel cell 14 includes a cooling area 22, through which a coolant, such as water, flows for cooling purposes.

During operation of the power generation system 10, an amount of residual fuel (i.e., not consumed in fuel cell 14) is recirculated in an anode recirculation loop 24 and an amount of fresh fuel is mixed with the residual fuel on an anode-inlet side, which is not described in any detail but known in the art. The anode recirculation loop 24 includes a recirculation device, such as a recirculation fan 26, that conducts the residual fuel to the inlet of anode 16. The power generation system 10 may include sensors 28, 30, which can serve to measure various characteristics of the residual fuel, such as pressure, temperature, concentration, and/or relative humidity.

A compressor 32 delivers an air stream to an inlet side of the cathode 18. One or more sensors 34 may measure various characteristics of the air stream, such as pressure, temperature, concentration, and/or relative humidity.

Reactant gases supplied to the anode 16 and the cathode 18 are humidified with water with humidifiers to maintain the moisture of the electrolyte 20 during operation of the power generation system 10. The humidified water added to the reactant gases is used for cooling the recirculation fan 26 and/or compressor 32.

After an operational shutdown of the power generation system 10, water in either vapor or droplet form generally remains in the reaction stream flow channels and the cooling water channels. The water vapor may condense when the temperature of the various components of power generation system 10 decreases over time. It is even possible for ice to form in power generation system 10 if the temperature falls below the freezing point of water. When resuming operation of the power generation system 10, any ice crystals that may have formed or water droplets that may remain within the fuel cell 14, or in other components of the power generation system 10, such as the recirculation fan 26 or the compressor 32, may lead to problems. Ice and/or water droplets can hinder the flow of the reactants and the coolant, and in particular, ice may adversely affect some system components with moving parts, such as the recirculation fan 26, the compressor 32 and/or the valves within the power generation system 10. (Although no valves are shown in FIG. 1, it is understood that power generation systems of the type described herein are generally equipped with a number of valves to control the fluid flows.)

After operation of power generation system 10 ceases, for example when a vehicle equipped with power generation system 10 is parked, the various system components are dried as completely as possible by collecting residual water at one or more desired collecting points. The collecting points include a condenser 36 and an adsorption unit 38, which contains a water adsorbing material 40 according to the illustrated embodiment. The condenser 36 is integrated into anode recirculation loop 24 where it is connected downstream of the recirculation fan 26. The adsorption unit 38 is integrated into the air supply/conducting system. Specifically, the adsorption unit 38 is disposed between the compressor 32 and the inlet of the cathode 18 so that warm compressed air from the outlet of the compressor 32 passes over the adsorbing material 40.

The condenser 36 acts as a condensation point because it is the coldest point in anode recirculation loop 24. Because of the temperature gradient, any residual water that is still present in the anode recirculation loop 24 after shutdown of the power generation system 10 is attracted to the condenser 36 where the water condenses. The temperature gradient between the condenser 36 and the fuel cell stack 12, as well as the other components of the anode recirculation loop 24, such as the recirculation fan 26, may be established during operation of the power generation system 10. For example, if the power generation system 10 is installed in a vehicle, the air draft may be used to cool the condenser 36. In other embodiments, it is possible to link the condenser 36 with a cooling fan 42, which selectively cools the condenser 36.

In order to maintain the temperature gradient between the condenser 36 and the other components of the anode recirculation loop 24, which includes the fuel cell stack 12, for a sufficiently long time after the operational shutdown of the power generation system 10, an insulating container 44 may be provided. In one embodiment, the insulating container 44 houses at least the fuel cell stack 12, the recirculation fan 26, and sensors 28, 30. The insulating container 44 has a thermally insulating effect and inhibits an equalization of the temperature of the components housed therein with respect to an ambient temperature external to the container 44. The condenser 36, on the other hand, is arranged outside of insulating container 44, and accordingly cools toward ambient temperature at a faster rate than components located within the container 44.

The configuration of condenser 36 may take various forms. In one embodiment, the condenser 36 is a pot-shaped container, in which the attracted water is collected. In another embodiment, the condenser 36 is formed from a curved piece of pipe. In yet another embodiment, the condenser 36 is a drain valve (not shown), which—when opened—discharges the collected water, as schematically indicated in FIG. 1 by arrow 46. The specific configuration of condenser 36 will depend on an expected quantity of residual water in the power generation system 10, especially in the anode recirculation loop 24, and also depend on the energy generated during condensation. For this reason, the condenser 36 is generally configured with a sufficiently large surface area to quickly radiate away the heat generated during condensation.

In order to further maintain the temperature gradient between the components inside the insulating container 44 and the condenser 36, the cooling fan 42 may continue to run after operation of the power generation system 10 has ceased according to at least one embodiment. In particular, it may be possible to cool the condenser 36 to a temperature below the ambient temperature by means of the cooling fan 42.

Additionally or alternatively, the adsorption unit 38 provides another option to extract residual water from the power generation system 10 and to selectively collect the water at a predetermined point. While the embodiments described herein are not limited to a specific type of adsorbing material, when choosing the type and quantity of adsorbing material 40, the overall expected quantity of residual water in power generation system 10 should be considered.

After residual water has been adsorbed in the cooling phase of the power generation system 10, regeneration of the adsorbing material 40 may be necessary during normal operation. In one embodiment, the heated and compressed air available at the outlet of the compressor 32 allows a highly effective desorption of the adsorbed water. In this embodiment, the adsorption unit 38 is arranged in spatial proximity to the compressor 32 to more effectively utilize the higher temperature compressed air.

It should be noted that in an alternative embodiment, the anode recirculation loop 24 contains a predetermined condensation point. In addition, other areas of the power generation system 10 may be similarly equipped. For example, alternatively or additionally, the oxidant supply system of the power generation system 10 may contain a condenser. Likewise, the coolant loop may contain a condenser. Similarly, the power generation system 10 may include more than one adsorption point. In the embodiment shown in FIG. 1, the adsorption point is located in the air supply system, however the adsorption point can alternatively or additionally be located in the anode recirculation loop 24 and/or the coolant loop.

In still other embodiments, the adsorption unit may be disposed in the anode recirculation loop 24 near the condenser 36. For example, the adsorption unit may be disposed in the immediate proximity of the condenser 36. Likewise, the oxidant system of the power generation system 10 may contain a condenser in addition to the adsorption unit 38.

In FIGS. 2 through 5, similar components or components with similar functions are identified by the same reference labels as in FIG. 1, with a lower-case letter appended. Unless specified differently in the following discussion, the functionality/composition of the components is generally as described above.

Figure 2:
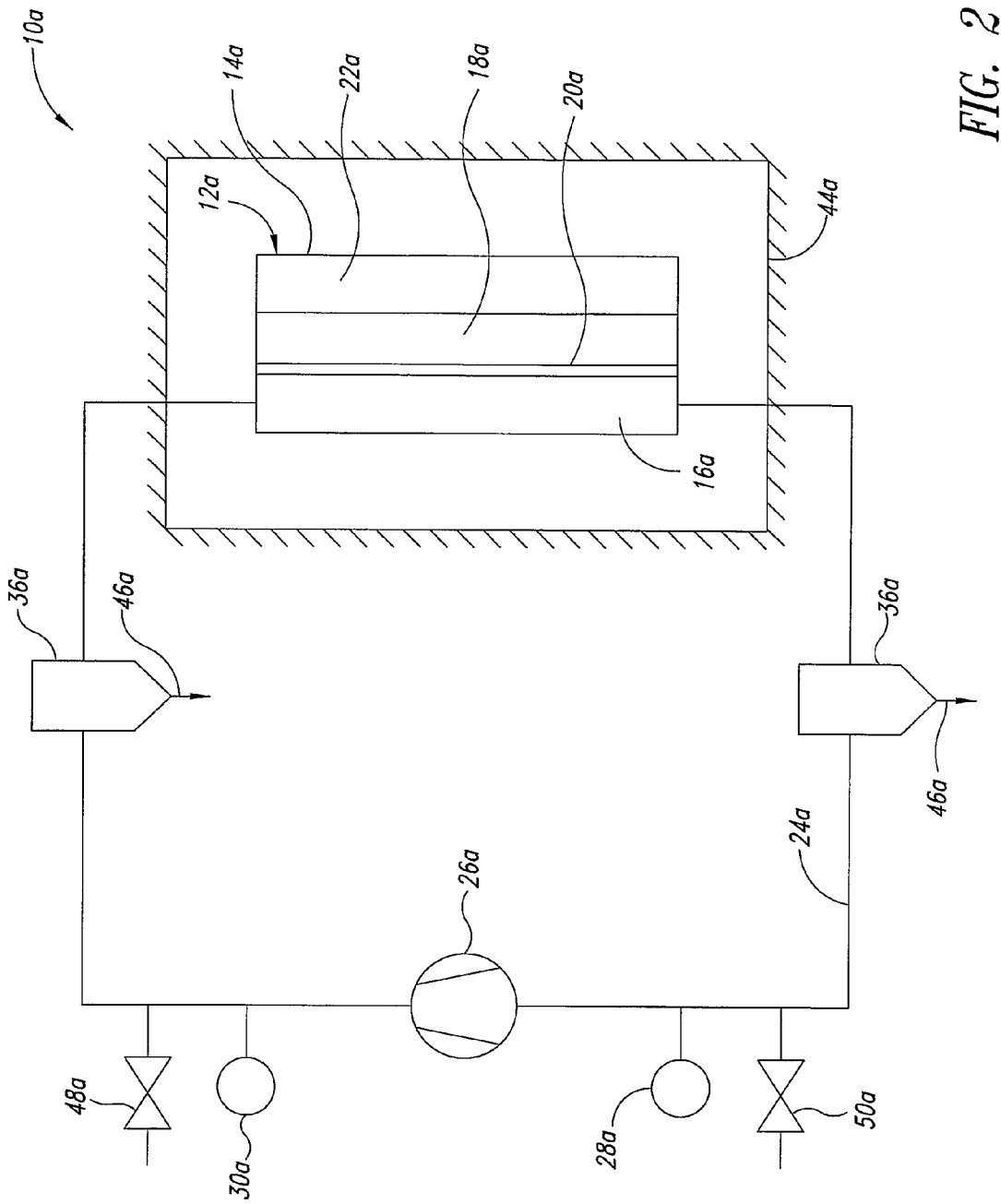
FIG. 2 is a schematic view of a power generation system with only a fuel cell stack housed in an insulating container according to another embodiment.
Figure 3:
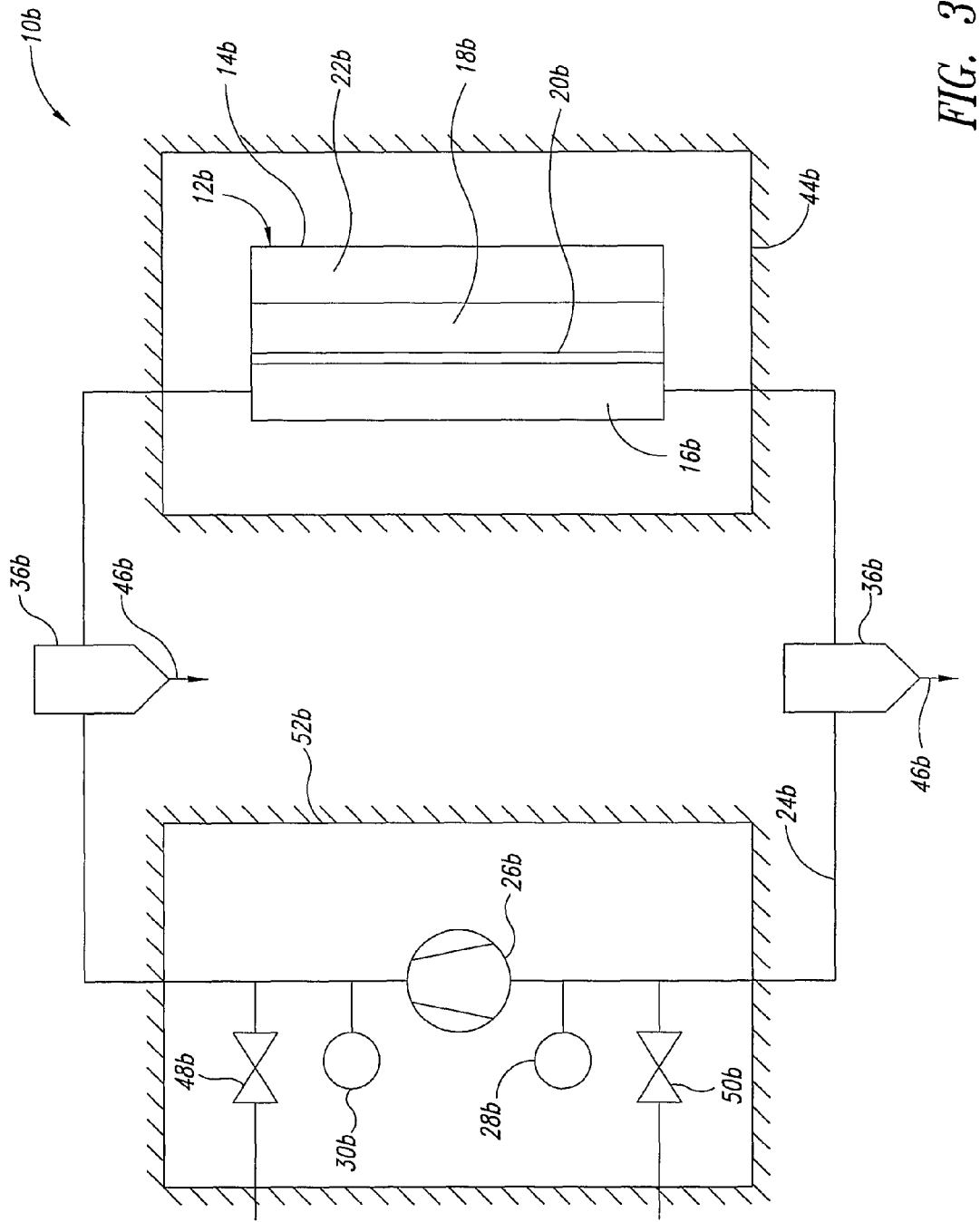
FIG. 3 is a schematic view of a power generation system with a fuel cell stack housed in a first insulating container and a fan, sensor, and valve housed in a second insulating container according to another embodiment.

In the embodiment shown in FIG. 2, only the fuel cell stack 12a is housed within the insulating container 44a, while the recirculation fan 26a of the anode recirculation loop 24a is arranged outside of the insulating container 44a. Two condensers 36a are disposed in the anode recirculation loop 24a, with one of the condensers positioned upstream of the recirculation fan 26a and the other condenser positioned downstream of the recirculation fan 26a.

A valve 48a serves to control the quantity of humidifying water being supplied to the power generation system 10a, while a valve 50a allows an amount of fuel to be discharged, or purged, from the power generation system 10a.

In the embodiment shown in FIG. 2, the valves 48a, 50a and the sensors 28a, 30a are disposed outside of the insulating container 44a. In the embodiment shown in FIG. 3, a second insulating container 52b is provided, which houses the recirculation fan 26b, the sensors 28b, 30b and the valves 48b, 50b. Only the two condensers 36b are located outside of the insulating containers 44b, 52b. It is understood other components of the power generation system 10b, which are not shown in FIG. 3, such as components related to the air supply system or the cooling loop of fuel cell stack 12b, may also be housed in one of the two insulating containers 44b, 52b.

Figure 4:
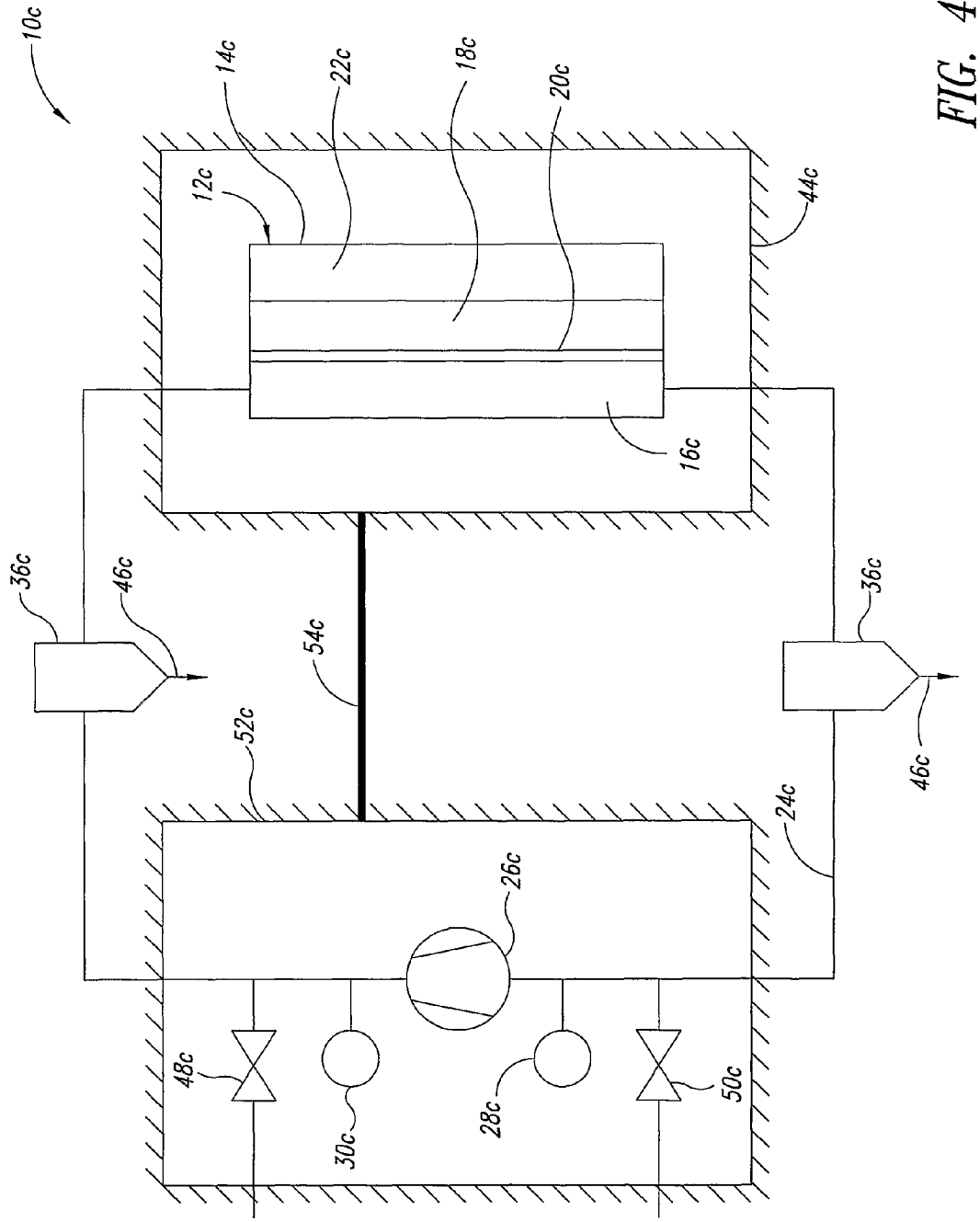
FIG. 4 is a schematic view of the power generation system of FIG. 3 with a thermal bridge connected between the first insulating container and the second insulating container.

The embodiment depicted in FIG. 4 includes a thermal bridge 54c, which extends between the two insulating containers 44c, 52c. The thermal bridge is formed of a material that is a good thermal conductor (e.g., copper) and provides for temperature equalization between the two insulating containers 44c, 52c; specifically for temperature equalization between the interiors of the containers 44c, 52c. The thermal bridge 54c allows the heat generated during operation of fuel cell stack 12c to be used to heat the components in insulating container 52c. This may be advantageous if the components housed in insulating container 52c generate no heat or only a small amount of heat during operation of the power generation system 10c.

Figure 5:
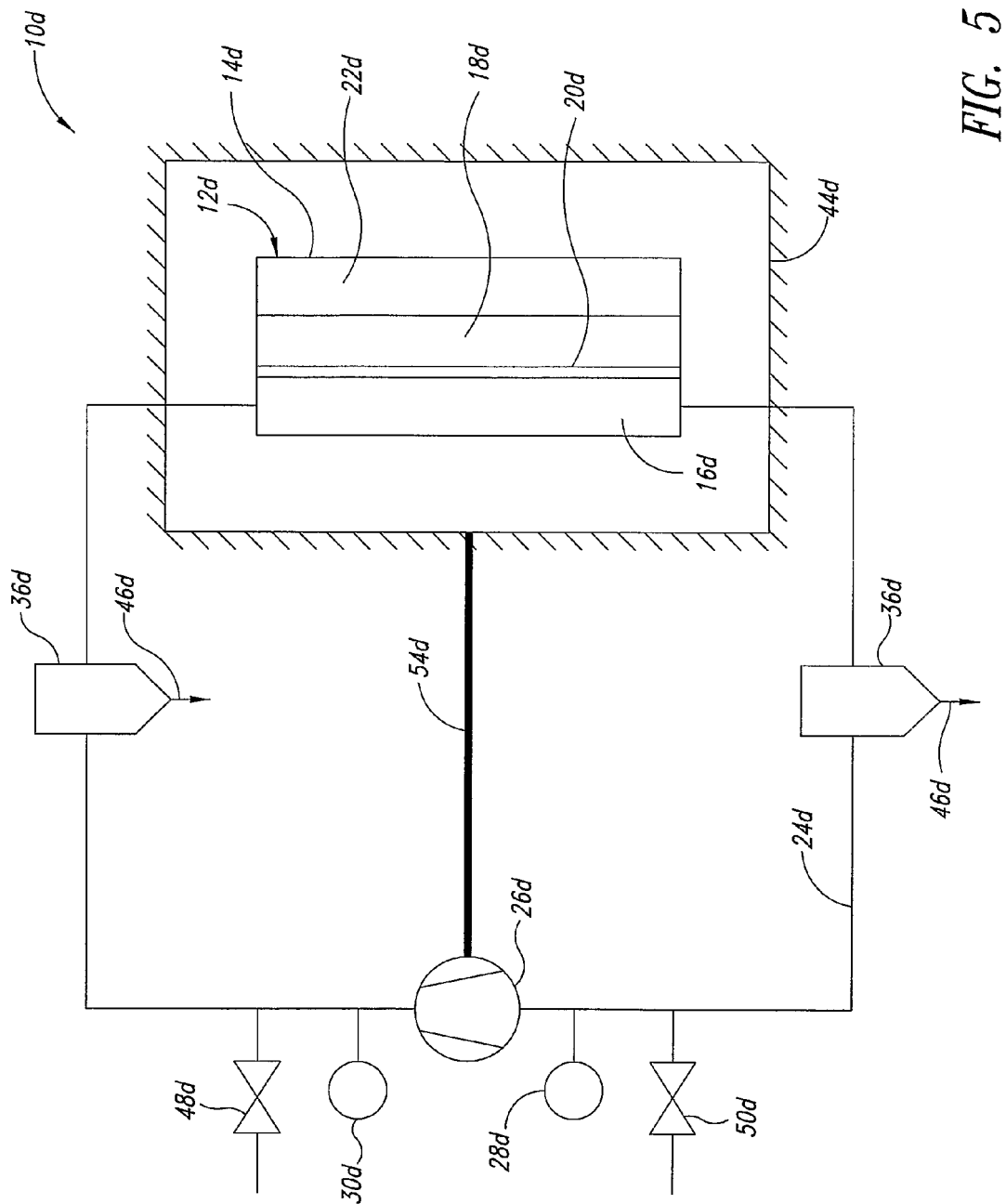
FIG. 5 is a schematic view of the power generation system of FIG. 2 with a thermal bridge connecting the insulating container to a recirculation fan.

FIG. 5 shows one insulating container 44d that houses the fuel cell stack 12d. The recirculation fan 26d is connected to the insulating container 44d with a thermal bridge 54d. The thermal bridge 54d allows selective heat transfer to individual components located outside of the insulating container 44d, for example the heat transfer from the insulating container 44d to the recirculation fan 26 as illustrated in the present embodiment. The thermal bridge 54d can also be connected to other "critical" components to transfer heat and thus remove residual water when operation of the power generation system 10d ceases. As those of ordinary skill in the art will appreciate, in other embodiments additional thermal bridges may connect insulating container 44d to other components, such as other circulation devices (fans, pumps, compressors, blowers, etc.) of power generation system 10d, or to valves.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A fuel cell based power generation system comprising:
   a first component that is operable to condense water present in the power generation system after an operational shutdown of the system, the first component having a first temperature after said operational shutdown;
   at least one other component having a second temperature that is higher than the first temperature of the first component after said operational shutdown, said at least one other component comprising a fuel cell stack having at least one fuel cell; and
   a subsystem to maintain a temperature gradient between the first component and the at least one other component for a period of time after the operational shutdown;
   wherein,
   the subsystem comprises a first thermal insulator that houses the at least one other component;
   the first component is situated outside the first thermal insulator, and attenuates weakening of the temperature gradient; and
   the first component is a condenser.

2. The power generation system of claim 1, wherein the at least one other component is selected from the group of components consisting of a sensor, a valve, and a fan.

3. The power generation system of claim 1, further comprising:
   a thermal bridge coupling the first thermal insulator to a second component of the power generation system, the second component being located outside of the first thermal insulator.

4. The power generation system of claim 3 wherein the thermal bridge is operable to selectively transfer heat from the first thermal insulator to the second component.

5. The power generation system of claim 1, further comprising: a water adsorbing material located within the power generation system to attract at least some water present within the system after the operational shutdown of the system.

6. The power generation system of claim 1, wherein the subsystem comprises a fan to cool the first component.

7. The power generation system according to claim 1, wherein the fuel cell stack of the at least one other component is in fluid communication with the first component.

8. A fuel cell based power generation system comprising:

a first component that is operable to condense water present in the power generation system after an operational shutdown of the system, the first component having a first temperature after said operational shutdown;

at least one other component having a second temperature that is higher than the first temperature of the first component after said operational shutdown, said at least one other component comprising a fuel cell stack having at least one fuel cell; and a subsystem to maintain a temperature gradient between the first component and the at least one other component for a period of time after the operational shutdown; wherein, the subsystem comprises a first thermal insulator that houses the at least one other component;

the first component is situated outside the first thermal insulator, and attenuates weakening of the temperature gradient; and the subsystem further comprises a second thermal insulator that houses a second component.

9. The power generation system of claim 8, wherein the second component is selected from the group of components consisting of a sensor, a valve, and a fan.

10. The power generation system of claim 8, further comprising a thermal bridge coupling the first thermal insulator to the second thermal insulator to allow heat transfer therebetween.

11. The power generation system according to claim 10, wherein the thermal bridge is made of a thermally conductive material.

12. The power generation system according to claim 11, wherein the thermally conductive material is copper.

* * * * *